(12) United States Patent
Kato

(10) Patent No.: US 8,405,703 B2
(45) Date of Patent: Mar. 26, 2013

(54) TELEVISION CONFERENCE APPARATUS, METHOD OF CONTROLLING TELEVISION CONFERENCE, AND COMPUTER-READABLE MEDIUM STORING CONTROL PROGRAM EXECUTABLE ON TELEVISION CONFERENCE APPARATUS

(75) Inventor: Masashi Kato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 495 days.

(21) Appl. No.: 12/659,225

(22) Filed: Mar. 1, 2010

(65) Prior Publication Data

US 2010/0231685 A1    Sep. 16, 2010

(30) Foreign Application Priority Data

Mar. 12, 2009  (JP) .................................. 2009-058828

(51) Int. Cl.
*H04N 7/14* (2006.01)
(52) U.S. Cl. ................ 348/14.08; 348/14.09; 348/14.12
(58) Field of Classification Search .... 348/14.01–14.16; 709/204; 715/255, 730, 731, 732, 753
See application file for complete search history.

(56) References Cited

U.S. PATENT DOCUMENTS

| 7,911,495 B2 * | 3/2011 | Tamaru et al. | 348/14.07 |
| 7,969,611 B2 * | 6/2011 | Kadota | 358/1.9 |
| 2007/0276910 A1 * | 11/2007 | Deboy et al. | 709/204 |

FOREIGN PATENT DOCUMENTS

JP    A-2006-197238    7/2006

* cited by examiner

*Primary Examiner* — Melur Ramakrishnaiah
(74) *Attorney, Agent, or Firm* — Oliff & Berridge, PLC

(57) ABSTRACT

A television conference apparatus that transmits display data to a plurality of terminals includes a first receiving device that receives terminal-specific data, a first display data creation device that creates first display data, a second receiving device that receives position information, a second display data creation device that creates second display data, a display data transmission device that transmits the second display data to the plurality of terminals, an edit authority storage device that stores edit authority information, a first determination device that determines whether each of the plurality of terminal-specific areas includes the position specified by the position information transmitted from a terminal that has the authority to edit the edit data displayed therein, and a command transmission device that transmits a first request information to a terminal corresponding to a first area and that transmits a second request information to a terminal corresponding to a second area.

8 Claims, 8 Drawing Sheets

| EDIT AUTHORITY TABLE | | | | |
| --- | --- | --- | --- | --- |
|  | TERMINAL A | TERMINAL B | TERMINAL C | TERMINAL D |
| TERMINAL-SPECIFIC AREA FOR TERMINAL A | 1 | 0 | 0 | 0 |
| TERMINAL-SPECIFIC AREA FOR TERMINAL B | 1 | 1 | 0 | 0 |
| TERMINAL-SPECIFIC AREA FOR TERMINAL C | 1 | 0 | 1 | 0 |
| TERMINAL-SPECIFIC AREA FOR TERMINAL D | 1 | 1 | 1 | 1 |

TELEVISION CONFERENCE APPARATUS, METHOD OF CONTROLLING TELEVISION CONFERENCE, AND COMPUTER-READABLE MEDIUM STORING CONTROL PROGRAM EXECUTABLE ON TELEVISION CONFERENCE APPARATUS

CROSS-REFERENCE TO RELATED APPLICATION

This application claims priority to Japanese Patent Application No. 2009-058828, filed Mar. 12, 2009, the content of which is hereby incorporated herein by reference in its entirety.

BACKGROUND

The present disclosure relates to a television conference apparatus, a method of controlling a television conference, and a computer-readable medium that stores a control program executable on a television conference apparatus. More specifically, the present disclosure relates to a television conference apparatus, a method of controlling a television conference, and a computer-readable medium that stores a control program executable on a television conference apparatus, all of which can switch a display screen.

A remote presentation system is known in which a plurality of communication terminals in remote locations are connected to a single television conference apparatus and an image of a participant and shared electronic data are displayed as if the conference were being conducted in a single location. In this sort of remote presentation system, an operation by a presenter is detected, and a screen that is used for a presentation is switched as the presentation proceeds. In addition, information on the switched screen is transmitted to client terminals of audience members.

SUMMARY

In the remote presentation system that is described above, when a screen that is used for the presentation is switched, it is necessary for the operation of the presenter who is making the presentation to be detected by a terminal of the presenter. Therefore, the screen may not be switched easily.

Various exemplary embodiments of the broad principles derived herein provide a television conference apparatus, a method of controlling a television conference, and a computer-readable medium that stores a control program executable on a television conference apparatus, all of which can easily switch a display screen.

Exemplary embodiments provide a television conference apparatus that transmits display data to a plurality of terminals, the display data being data for displaying an image in a display area, the plurality of terminals being connected to the television conference apparatus. The television conference apparatus includes a first receiving device that receives terminal-specific data that are one of terminal image data and edit data, the terminal image data being image data transmitted from each of the plurality of terminals, and the edit data being editable data transmitted from each of the plurality of terminals, a first display data creation device that creates first display data that are display data for displaying the terminal-specific data transmitted from each of the plurality of terminals in each of a plurality of terminal-specific areas, the plurality of terminal-specific areas being included in the display area and respectively corresponding to the plurality of terminals, a second receiving device that receives position information transmitted from each of the plurality of terminals, the position information being information that specifies a position indicated by a pointer in the display area, and the pointer corresponding to each of the plurality of terminals, and a second display data creation device that creates second display data by combining pointer image data with the created first display data, the pointer image data being image data of the pointer that is located at the position specified by the received position information. The television conference apparatus further includes a display data transmission device that transmits the second display data created by the second display data creation device to the plurality of terminals, an edit authority storage device that stores edit authority information in association with identification information, the identification information being information that identifies each of the plurality of terminals, and the edit authority information being information that indicates whether each of the plurality of terminals identified by the identification information has authority to edit edit data displayed in each of the plurality of terminal-specific areas, and a first determination device that determines whether each of the plurality of terminal-specific areas includes the position specified by the position information transmitted from a terminal that has the authority to edit the edit data displayed therein based on the position information received by the second receiving device and on the edit authority information stored in the edit authority storage device. The television conference apparatus also includes a command transmission device that transmits a first request information to a terminal corresponding to a first area and that transmits a second request information to a terminal corresponding to a second area, the first request information being information for requesting that the edit data be transmitted as the terminal-specific data, the first area being a terminal-specific area which the first determination device has determined includes the position specified by the position information transmitted from the terminal that has the authority to edit the edit data displayed therein, the second request information being information for requesting that the terminal image data be transmitted as the terminal-specific data, and the second area being a terminal-specific area which the first determination device has determined does not include the position specified by the position information transmitted from the terminal that has the authority to edit the edit data displayed therein.

Exemplary embodiments further provide a method for controlling a television conference in which display data are transmitted to a plurality of terminals, the display data being data for displaying an image in a display area, the plurality of terminals being connected to a television conference apparatus. The method includes the steps of receiving terminal-specific data that are one of terminal image data and edit data, the terminal image data being image data transmitted from each of the plurality of terminals, and the edit data being editable data transmitted from each of the plurality of terminals, creating first display data that are display data for displaying the terminal-specific data transmitted from each of the plurality of terminals in each of a plurality of terminal-specific areas, the plurality of terminal-specific areas being included in the display area and respectively corresponding to the plurality of terminals, receiving position information transmitted from each of the plurality of terminals, the position information being information that specifies a position indicated by a pointer in the display area, and the pointer corresponding to each of the plurality of terminals, and creating second display data by combining pointer image data with the created first display data, the pointer image data being image data of the pointer that is located at the position specified by the received position information. The method further includes the steps of transmitting the created second display data to the plurality of terminals, and determining whether each of the plurality of terminal-specific areas includes the position specified by the position information transmitted from a terminal that has authority to edit edit data displayed therein based on the received position information and on edit authority information, the edit authority information being information that indicates whether each of the plurality of terminals identified by an identification information has the authority to edit the edit data displayed in each of the plurality of terminal-specific areas and that is associated with the identification information, and the identification information being information that identifies each of the plurality of terminals. The method also includes the steps of transmitting a first request information to a terminal corresponding to a first area, the first request information being information for requesting that the edit data be transmitted as the terminal-specific data, and the first area being a terminal-specific area which has been determined to include the position specified by the position information transmitted from the terminal that has the authority to edit the edit data displayed therein, and transmitting a second request information to a terminal corresponding to a second area, the second request information being information for requesting that the terminal image data be transmitted as the terminal-specific data, and the second area being a terminal-specific area which has been determined not to include the position specified by the position information transmitted from the terminal that has the authority to edit the edit data displayed therein.

Exemplary embodiments also provide a computer-readable medium storing a control program executable on a television conference apparatus that transmits display data to a plurality of terminals, the display data being data for displaying an image in a display area, the plurality of terminals being connected to the television conference apparatus. The program includes instructions that cause a computer to perform the steps of receiving terminal-specific data that are one of terminal image data and edit data, the terminal image data being image data transmitted from each of the plurality of terminals, and the edit data being editable data transmitted from each of the plurality of terminals, creating first display data that are display data for displaying the terminal-specific data transmitted from each of the plurality of terminals in each of a plurality of terminal-specific areas, the plurality of terminal-specific areas being included in the display area and respectively corresponding to the plurality of terminals, receiving position information transmitted from each of the plurality of terminals, the position information being information that specifies a position indicated by a pointer in the display area, and the pointer corresponding to each of the plurality of terminals, and creating second display data by combining pointer image data with the created first display data, the pointer image data being image data of the pointer that is located at the position specified by the received position information. The program further includes instructions that cause the computer to perform the steps of transmitting the created second display data to the plurality of terminals, and determining whether each of the plurality of terminal-specific areas includes the position specified by the position information transmitted from a terminal that has authority to edit edit data displayed therein based on the received position information and on edit authority information, the edit authority information being information that indicates whether each of the plurality of terminals identified by an identification information has the authority to edit the edit data displayed in each of the plurality of terminal-specific areas and that is associated with the identification information, and the identification information being information that identifies each of the plurality of terminals. The program also includes instructions that cause the computer to perform the steps of transmitting a first request information to a terminal corresponding to a first area, the first request information being information for requesting that the edit data be transmitted as the terminal-specific data, and the first area being a terminal-specific area which has been determined to include the position specified by the position information transmitted from the terminal that has the authority to edit the edit data displayed therein, and transmitting a second request information to a terminal corresponding to a second area, the second request information being information for requesting that the terminal image data be transmitted as the terminal-specific data, and the second area being a terminal-specific area which has been determined not to include the position specified by the position information transmitted from the terminal that has the authority to edit the edit data displayed therein.

BRIEF DESCRIPTION OF THE DRAWINGS

Exemplary embodiments will be described below in detail with reference to the accompanying drawings in which:

FIG. 4 is a schematic figure that shows a configuration of an edit authority table;

DETAILED DESCRIPTION

Hereinafter, a television conference system 1 that is an embodiment of the present disclosure will be explained with reference to the drawings. First, an overview of the television conference system 1 will be explained with reference to FIG. 1.

Figure 1:
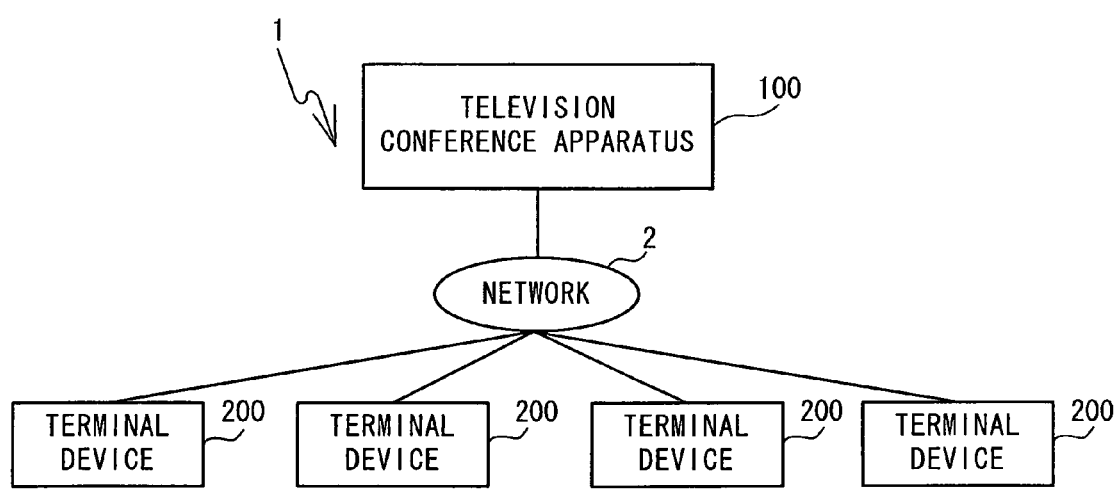
FIG. 1 is a figure that shows an example of a state of connection in a television conference system.

As shown in FIG. 1, a plurality of terminal devices 200 are connected to a television conference apparatus 100 through a network 2. A television conference may be conducted by performing transmission and receiving of an image and a sound among the terminal devices 200. In FIG. 1, four of the terminal devices 200 are shown. In actuality, any number of the terminal devices 200 that is at least two may be used as long as the television conference can be conducted through the network 2. The plurality of the terminal devices 200 may be located within a single site of a company. The plurality of the terminal devices 200 may be distributed among different offices, different regions, and different countries.

The television conference apparatus 100 may be a general-purpose type of device such as a known personal computer or the like, for example. The television conference apparatus 100 is a device that implements a television conference among the plurality of the terminal devices 200 by relaying an image, a sound, data, and the like that are transmitted from the terminal devices 200. By combining terminal-specific data that are transmitted from the individual terminal devices 200, the television conference apparatus 100 creates data for a display that is shared in the television conference. Hereinafter, the terminal-specific data that are transmitted from the individual terminal devices 200 are referred to as the terminal-specific data. Hereinafter, the data for the display that is shared in the television conference are referred to as the display data. The television conference apparatus 100 has a function that transmits a sound and the display data to the plurality of the terminal devices 200 that are connected to the television conference apparatus 100.

The terminal devices 200 are general-purpose type devices such as known personal computers or the like, for example. A camera 250 (refer to FIG. 5), a microphone 240 (refer to FIG. 5), a monitor 270 (refer to FIG. 5), and a speaker 260 (refer to FIG. 5) are connected to each of the terminal devices 200. The camera 250 is used for inputting to the terminal device 200 from the outside an image that will be used in the television conference. The microphone 240 is used for inputting to the terminal device 200 from the outside a sound of a participant in the television conference. The monitor 270 is used for displaying an image that has been received from the television conference apparatus 100 by the terminal device 200. The speaker 260 is used for outputting a sound to the outside.

Figure 2:
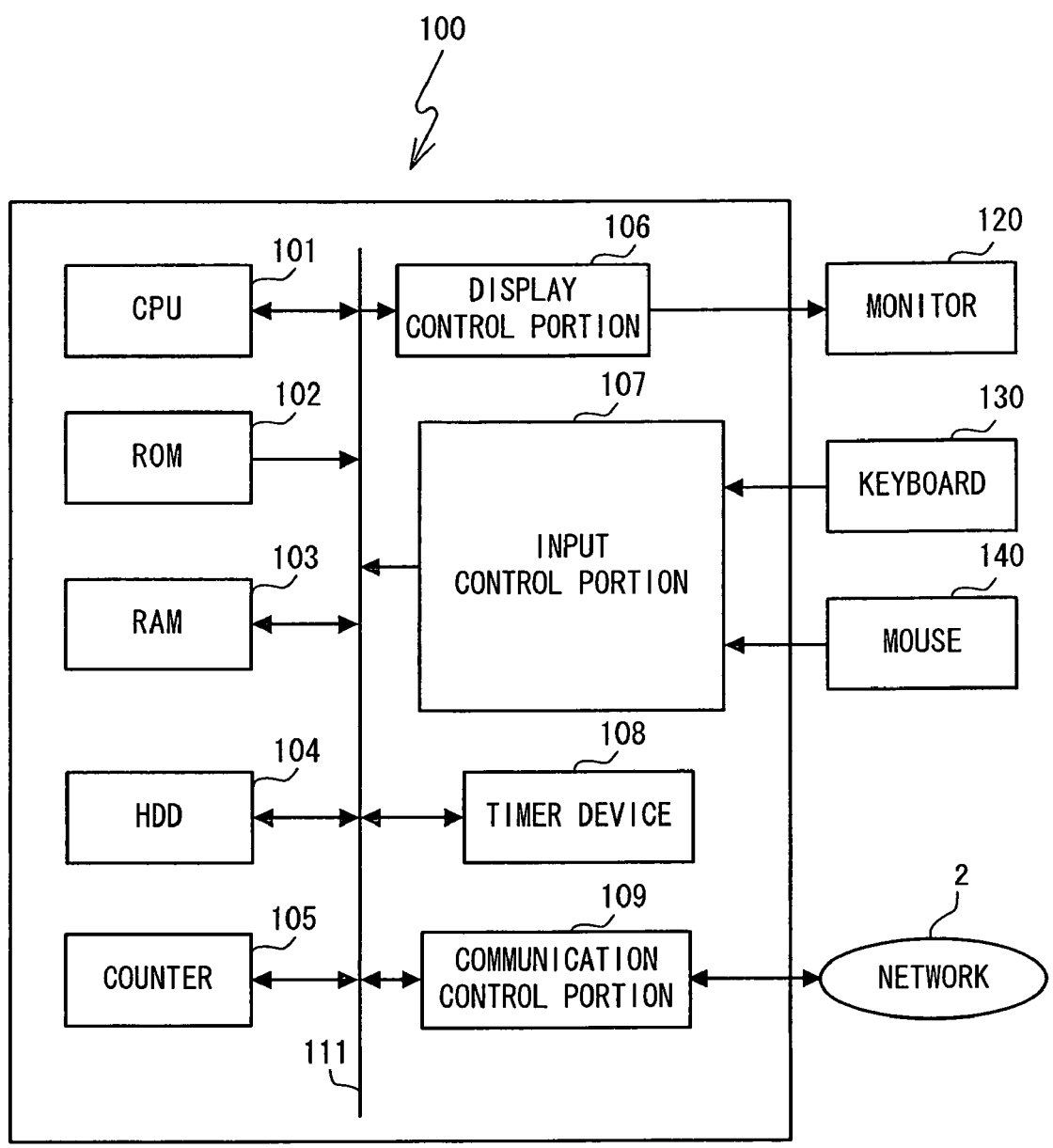
FIG. 2 is a block diagram that shows an electrical configuration of a television conference apparatus.

Next, an electrical configuration of the television conference apparatus 100 will be explained with reference to the block diagram in FIG. 2. As shown in FIG. 2, the television conference apparatus 100 includes a CPU 101 that performs control of the television conference apparatus 100. A ROM 102, a RAM 103, a hard disk drive (HDD) 104, a counter 105, a display control portion 106, an input control portion 107, a timer device 108, and a communication control portion 109 are connected to the CPU 101 via a bus 111.

The ROM 102 stores a program that runs a BIOS that the CPU 101 executes and a setting value. The RAM 103 stores various types of data temporarily. The HDD 104 stores various types of programs and the like that are executed in the television conference apparatus 100. The counter 105 functions as a timer and measures time.

The display control portion 106 is connected to a monitor 120 for displaying an operation screen, and controls the display on the monitor 120. The input control portion 107 is connected to a keyboard 130 and a mouse 140 by which a user performs an input of an operation, and controls the input from the keyboard 130 and the mouse 140. The timer device 108 keeps time. The communication control portion 109 is connected to the network 2 and performs control of transmission and receiving of data to and from the terminal devices 200.

Figure 3:
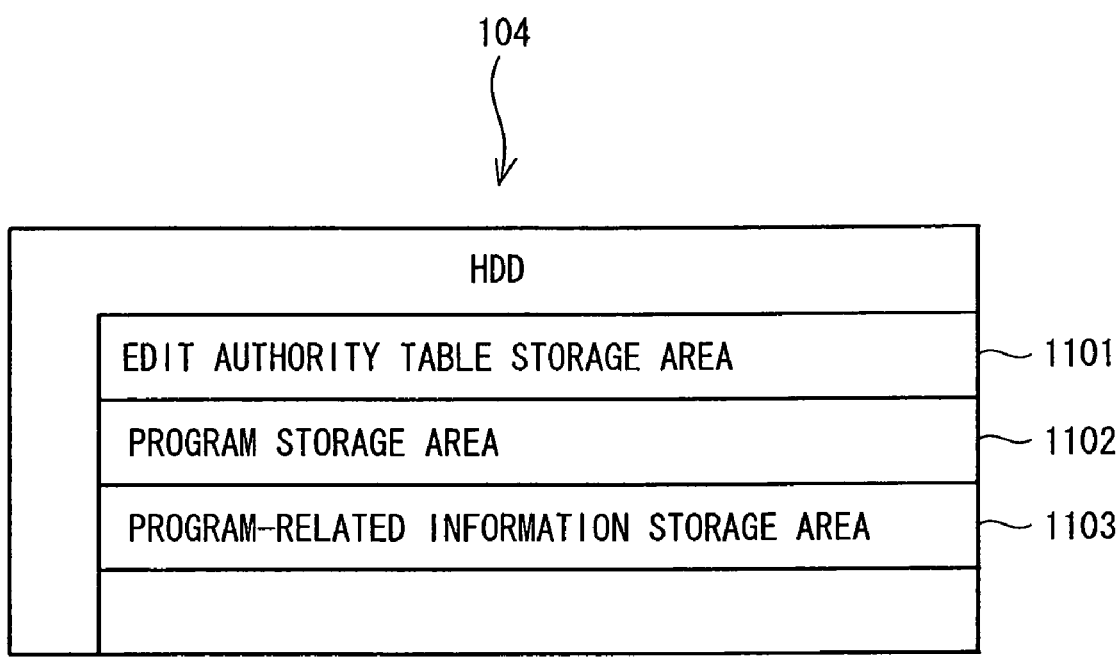
FIG. 3 is a schematic figure that shows a configuration of storage areas in a hard disk drive of the television conference apparatus.

The HDD 104 will be explained in detail with reference to FIG. 3. As shown in FIG. 3, the HDD 104 is provided with a plurality of storage areas that include an edit authority table storage area 1101, a program storage area 1102, and a program-related information storage area 1103.

An edit authority table 1100 (refer to FIG. 4) is stored in the edit authority table storage area 1101. The edit authority table 1100 will be described in detail later. Various types of programs for causing the television conference apparatus 100 to perform various types of processing are stored in the program storage area 1102. The various types of programs may be stored in a CD-ROM and installed through a CD-ROM drive (not shown in the drawings), for example, then stored in the program storage area 1102. A program that has been downloaded through the network 2 may be stored in the program storage area 1102. Information such as settings, initial values, data, and the like that are necessary for the execution of a program is stored in the program-related information storage area 1103.

The edit authority table 1100 will be explained in detail with reference to FIG. 4. The edit authority table 1100 is a table in which is stored information that indicates whether each of the terminal devices 200 has authority to edit editable data, such as a document or the like, that can be displayed in each of terminal-specific areas of a television conference screen 271 (refer to FIG. 6), which is displayed on the monitor 270 of each of the terminal devices 200. The terminal-specific area herein refers to an area that corresponds to one of the terminal devices 200 that are connected to the television conference apparatus 100. Hereinafter, the editable data, such as the document or the like, that can be displayed in the terminal-specific area are referred to as the edit data.

As shown in FIG. 4, for each identifier that identifies one of the terminal devices 200 (in the example in FIG. 4, terminals A, B, C, D), the edit authority table 1100 indicates whether the edit data that are displayed in the terminal-specific area 272 for each of the various terminal devices 200 can be edited. Hereinafter, the identifiers that identify the terminal devices 200 are referred to as the terminal IDs. If the edit data that are displayed in the terminal-specific area 272 that corresponds to one of the terminal devices 200 can be edited, a value of one is stored. If the edit data that are displayed in the terminal-specific area 272 that corresponds to one of the terminal devices 200 cannot be edited, a value of zero is stored.

For example, in FIG. 4, the edit authority table 1100 indicates that the edit data that are displayed in the terminal-specific areas 272 that correspond to all of the terminal devices 200 that are connected to the television conference apparatus 100 can be edited for the terminal device 200 for which the terminal ID is terminal A (hereinafter referred to as the terminal device 200A). The edit data that are displayed in the terminal-specific areas 272 that respectively correspond to the terminal device 200 for which the terminal ID is terminal B (hereinafter referred to as the terminal device 200B) and the terminal device 200 for which the terminal ID is terminal D (hereinafter referred to as the terminal device 200D) can be edited for the terminal device 200B. The edit data that are displayed in the terminal-specific areas 272 that respectively correspond to the terminal device 200 for which the terminal ID is terminal C (hereinafter referred to as the terminal device 200C) and the terminal device 200D can be edited for the terminal device 200C. Only the edit data that are displayed in the terminal-specific area 272 that corresponds to the terminal device 200D can be edited for the terminal device 200D. Hereinafter, the terminal-specific areas 272 that respectively correspond to the terminal devices 200A to 200D are respectively referred to as the terminal-specific areas 272A to 272D.

Figure 5:
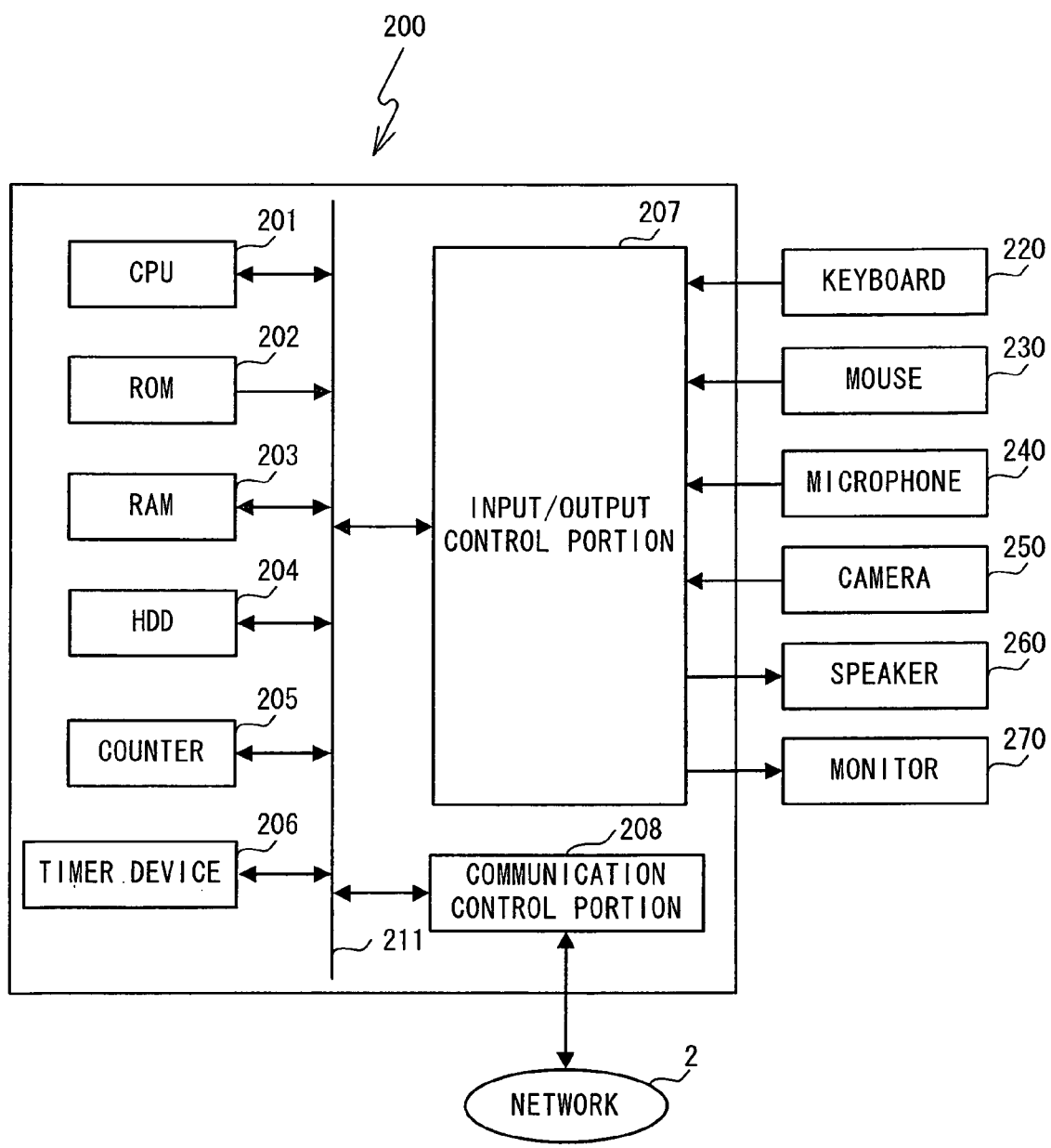
FIG. 5 is a block diagram that shows an electrical configuration of a terminal device.

An electrical configuration of the terminal device 200 will be explained with reference to the block diagram in FIG. 5. As shown in FIG. 5, the terminal device 200 includes a CPU 201 that performs control of the terminal device 200. A ROM 202, a RAM 203, a hard disk drive (HDD) 204, a counter 205, a timer device 206, an input/output control portion 207, and a communication control portion 208 are connected to the CPU 201 via a bus 211.

The ROM 202 stores a program that runs a BIOS that the CPU 201 executes and a setting value. The RAM 203 stores various types of data temporarily. The HDD 204 stores various types of programs and the like that are executed in the terminal device 200. The counter 205 functions as a timer and measures time. The timer device 206 keeps time.

A keyboard 220, a mouse 230, the microphone 240, the camera 250, the speaker 260, and the monitor 270 are connected to the input/output control portion 207. The keyboard 220 and the mouse 230 are used when the user performs input of an operation. The microphone 240 is used for acquiring sound data from the user for use in the television conference. The camera 250 acquires image data for use in the television conference. The speaker 260 is used for outputting sound data that has been transmitted from the television conference apparatus 100 while the television conference is being conducted. The monitor 270 is used for displaying the display data that are transmitted from the television conference apparatus 100. The communication control portion 208 controls the transmitting and receiving of data to and from an external device such as the television conference apparatus 100 and the like through the network 2. The keyboard 220 and the mouse 230 may not to be used when the user performs the input of an operation. For example, the input of an operation may be performed by using a remote control device.

The television conference screen 271 that is displayed on the monitor 270 that is connected to the terminal device 200 will be explained with reference to FIG. 6.

Figure 6:
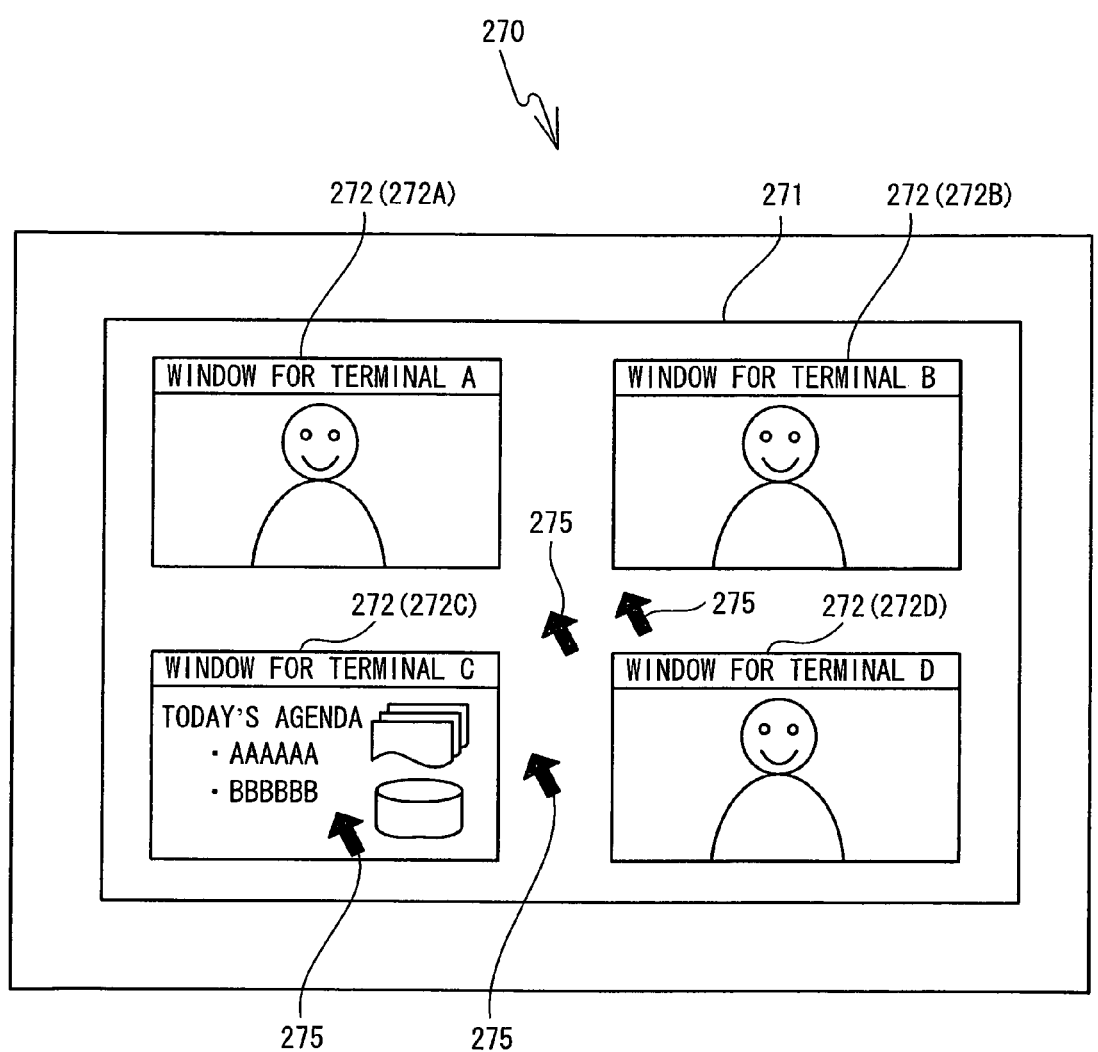
FIG. 6 is a figure that shows an example of a television conference screen that is displayed on a monitor of the terminal device.

When a television conference is conducted, the television conference screen 271 is displayed on the monitor 270 of each of the terminal devices 200, as shown in FIG. 6. The television conference screen 271 includes the terminal-specific areas 272 (272A to 272D), which are provided for the respective terminal devices 200. The respective pieces of terminal-specific data that are transmitted to the television conference apparatus 100 from the respective terminal devices 200 that are connected to the television conference apparatus 100 are displayed in the respective terminal-specific areas 272. The terminal-specific data may be, for example, image data for an image that has been captured by the camera 250 that is connected to one of the terminal devices 200, or edit data such as a document or the like that is displayed on the television conference screen 271 of each of the terminal devices 200. The edit data may be displayed on the monitor 270 separately from the television conference screen 271.

A cursor image 275 for the mouse 230 of each of the terminal devices 200 that are connected to the television conference apparatus 100 is displayed on the television conference screen 271. The cursor image 275 is displayed at a position that is based on information about the position of the cursor that is transmitted from the corresponding terminal device 200. Hereinafter, the information about the position of the cursor that is transmitted from the corresponding terminal device 200 is referred to as the position information. In the present embodiment, the cursor image 275 is displayed in the form of an arrow mark, as an example. The position of the cursor may be indicated by another form of display, as long as the user can determine the position of the cursor. A position other than the position of the cursor for the mouse 230 may be indicated. For example, in a case where a remote control device is used, the position of a pointer of the remote control device may be indicated.

Figure 7:
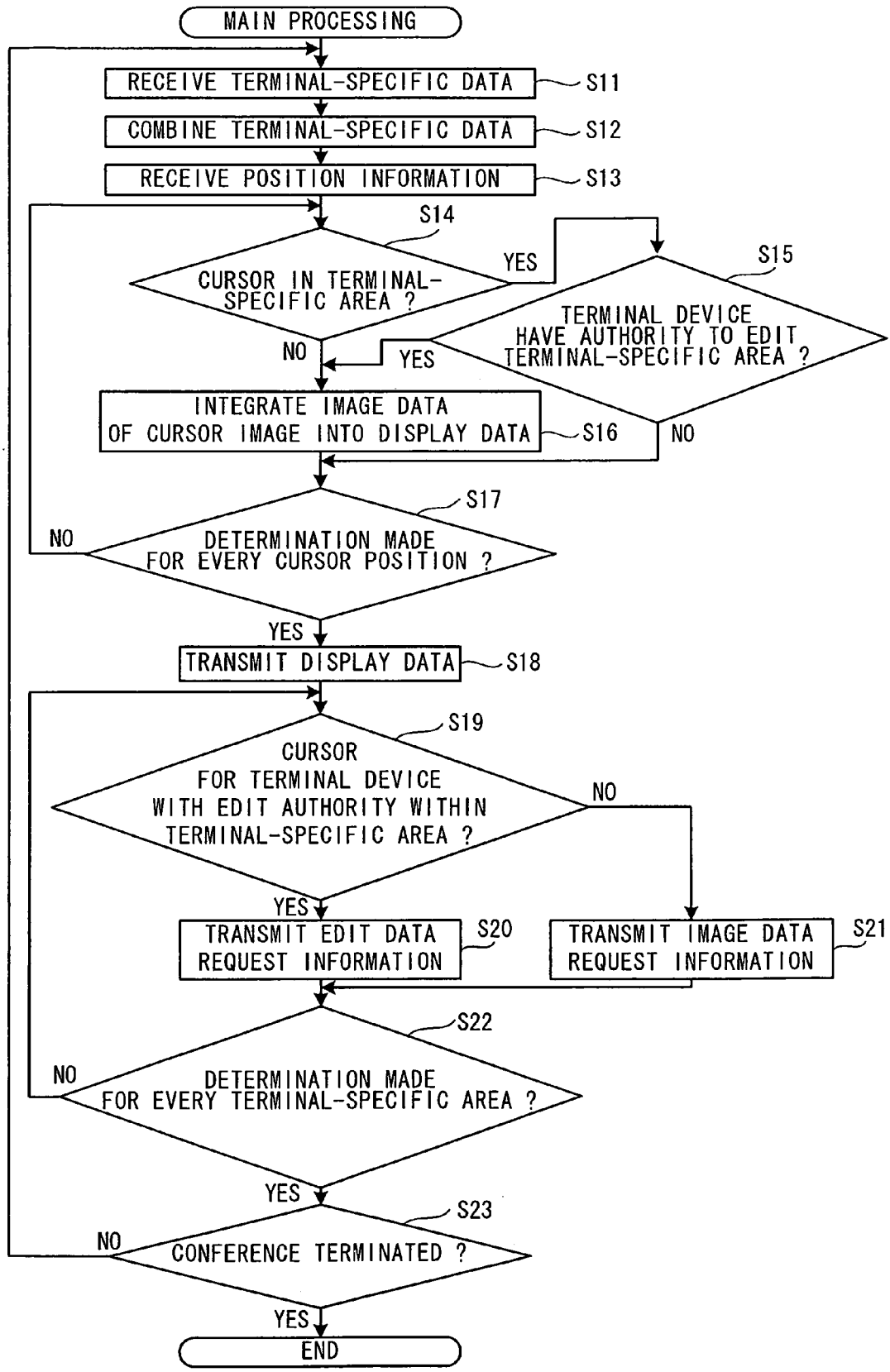
FIG. 7 is a flowchart of main processing that is performed by the television conference apparatus.

Main processing that is performed by the television conference apparatus 100 will be explained with reference to FIG. 7. The main processing that is shown in FIG. 7 is performed by the CPU 101 in accordance with a program that is stored in the program storage area 1102 of the HDD 104. The main processing in FIG. 7 is performed when the power supply of the television conference apparatus 100 is turned on. The main processing in FIG. 7 is automatically terminated when the power supply of the television conference apparatus 100 is turned off. Other processing that is performed by the television conference apparatus 100 is performed for other processes, and detailed explanations will be omitted.

When main processing in FIG. 7 is performed, the terminal-specific data to be displayed in the terminal-specific areas 272 that correspond to the respective terminal devices 200 are received from the terminal devices 200 that are connected to the television conference apparatus 100 (Step S11). Once the terminal-specific data have been received from the individual terminal devices 200, the terminal-specific data are combined into the display data that will be displayed on the television conference screens 271, such that the terminal-specific data for each of the terminal devices 200 will be displayed in the terminal-specific area 272 that corresponds to the terminal device 200 that transmitted the terminal-specific data (Step S12).

Next, the position information of the mouse cursor that will be used in operating the individual terminal devices 200 is received from the individual terminal devices 200 (Step S13). In the present embodiment, the position information includes coordinates of the position of the mouse cursor. In FIG. 6, the upper left corner of the television conference screen 271 is the origin point for the coordinates, with the rightward direction indicating the positive direction on the X axis and the downward direction indicating the negative direction on the Y axis.

Next, a determination is made as to whether the mouse cursor is in one of the terminal-specific areas 272 (Step S14). Specifically, a determination is made as to whether the position that is specified by the position information is within one of the terminal-specific areas 272 on the television conference screen 271. If it is determined that the mouse cursor is in one of the terminal-specific areas 272 (YES at Step S14), a determination is made as to whether the terminal device 200 that transmitted the position information has the authority to edit the terminal-specific area 272 in which the mouse cursor is located (Step S15). Hereinafter, the terminal device 200 that transmitted the position information is referred to as the cursor terminal device. The determination processing is performed based on the edit authority table 1100 that is stored in the edit authority table storage area 1101 in the HDD 104.

For example, a case is considered where the determination at Step S15 is made based on the edit authority table 1100 that is shown in FIG. 4. According to the edit authority table 1100, the terminal device 200B is able to edit the edit data that are displayed in the terminal-specific area 272D for the terminal device 200D. Therefore, in a case where the cursor terminal device is the terminal device 200B, and the position that is specified by the position information is within the terminal-specific area 272D for the terminal device 200D, the determination is made that the terminal device 200B has the authority to edit the terminal-specific area 272D for the terminal device 200D.

If it is determined that the cursor terminal device has the authority to edit the terminal-specific area 272 in which the mouse cursor is located (YES at Step S15), the image data for the cursor image 275 is integrated into the display data (Step S16). In this case, the image data for the cursor image 275 is integrated at the position that is specified by the position information. Next, a determination is made as to whether the determination processing at Step S14 has been performed for each of the received position information (Step S17).

If it is determined that the cursor terminal device does not have the authority to edit the terminal-specific area 272 in which the mouse cursor is located (NO at Step S15), the integration processing at Step S16 is not performed, and the processing proceeds to Step S17.

If it is determined that the mouse cursor is not in one of the terminal-specific areas 272 (NO at Step S14), the image data for the cursor image 275 is integrated into the display data (Step S16). In this case, the image data for the cursor image 275 is integrated such that the cursor image 275 is displayed outside of the terminal-specific areas 272 on the television conference screen 271.

If it is determined that there is received position information for which the determination processing at Step S14 has not been performed (NO at Step S17), the processing returns to Step S14. The determination processing at Step S14 is then performed for the position information for which the determination processing at Step S14 has not been performed.

In a case where it is determined that the determination processing at Step S14 has been performed for all of the received position information (YES at Step S17), the display data are transmitted to all of the terminal devices 200 that are connected to the television conference apparatus 100 (Step S18).

Next, for each of the terminal-specific areas 272 on the television conference screen 271, a determination is made as to whether at least one cursor that corresponds to one of the terminal devices 200 that can edit the edit data that are displayed in the terminal-specific area 272 is located in the terminal-specific area 272 (Step S19). The determination processing is performed based on the edit authority table 1100 that is stored in the edit authority table storage area 1101 in the HDD 104. For example, a case is considered where the determination at Step S19 is made based on the edit authority table 1100 that is shown in FIG. 4. For the terminal-specific area 272B for the terminal device 200B, a determination is made as to whether at least one of the cursor for the terminal device 200A and the cursor for the terminal device 200B is located in the terminal-specific area 272B.

If it is determined that at least one cursor that corresponds to one of the terminal devices 200 that can edit the edit data that are displayed in a particular terminal-specific area 272 is located in that terminal-specific area 272 (YES at Step S19), edit data request information is transmitted to the terminal device 200 that corresponds to the terminal-specific area 272 (Step S20). The edit data request information is information for requesting that the edit data be transmitted as the terminal-specific data. Next, a determination is made as to whether the determination processing at Step S19 has been performed for all of the terminal-specific areas 272 that are provided on the television conference screen 271 (Step S22).

If it is determined that no cursor that corresponds to one of the terminal devices 200 that can edit the edit data that are displayed in a particular terminal-specific area 272 is located in that terminal-specific area 272 (NO at Step S19), image data request information is transmitted to the terminal device 200 that corresponds to the terminal-specific area 272 (Step S21). The image data request information is information for requesting that the image data for an image that has been captured by the camera 250 be transmitted as the terminal-specific data. The processing then proceeds to Step S22.

If it is determined that the determination processing at Step S19 has not been performed for all of the terminal-specific areas 272 that are provided on the television conference screen 271 (NO at Step S22), the processing returns to Step S19. The processing at Step S19 is then performed for one of the terminal-specific areas 272 for which the determination processing at Step S19 has not yet been performed. In the present embodiment, the determination processing at Step S19 is performed for the terminal-specific areas 272A to 272D in that order.

If it is determined that the determination processing at Step S19 has been performed for all of the terminal-specific areas 272 (YES at Step S22), processing is performed that determines whether the television conference has been terminated (Step S23). Specifically, a determination is made as to whether a termination notification has been received from every one of the terminal devices 200 that are connected to the television conference apparatus 100. The termination notification is a signal that is transmitted from the terminal device 200 when a termination button (not shown in the drawings) that is provided in the terminal device 200 is pressed.

If it is determined that the television conference has been terminated (YES at Step S23), that is, if the termination button has been pressed on every one of the terminal devices 200 that are connected to the television conference apparatus 100 and it has been determined that the termination notification has been received from every one of the terminal devices 200, the main processing is terminated.

If it is determined that the television conference has not been terminated (NO at Step S23), that is, if the termination button has not been pressed on every one of the terminal devices 200 that are connected to the television conference apparatus 100, the processing returns to Step S11.

Figure 8:
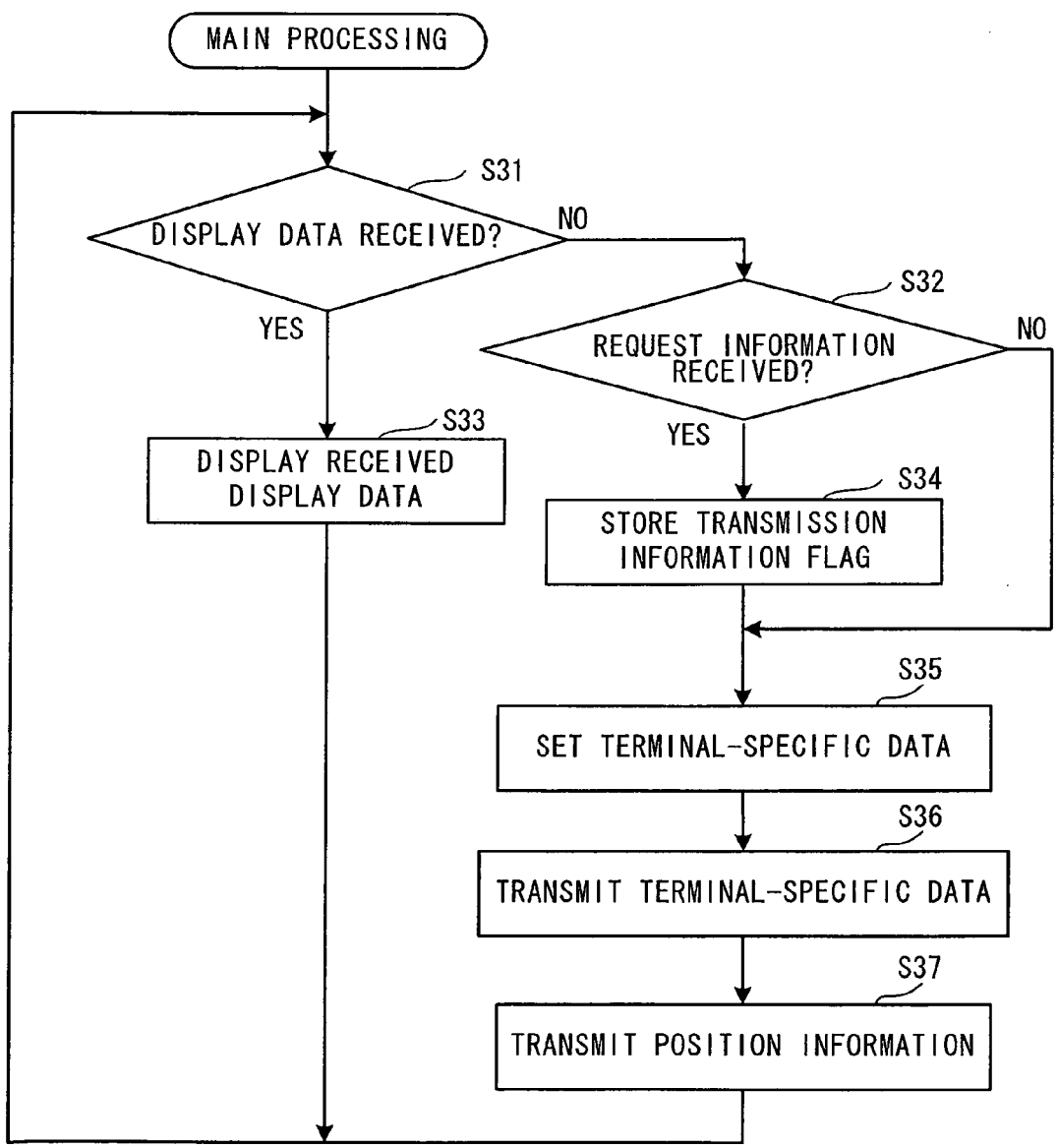
FIG. 8 is a flowchart of main processing that is performed by the terminal device.

Main processing that is performed by each of the terminal devices 200 will be explained with reference to FIG. 8. The main processing that is shown in FIG. 8 is performed by the CPU 201 in accordance with a program that is stored in the HDD 204. The main processing in FIG. 8 is performed when the power supply of the terminal device 200 is turned on. The main processing in FIG. 8 is automatically terminated when the power supply of the terminal device 200 is turned off. Other processing that is performed by the terminal device 200 is performed for other processes, and detailed explanations will be omitted.

When the main processing in FIG. 8 is performed, a determination is made as to whether the display data have been received from the television conference apparatus 100 (Step S31). The display data are transmitted in the main processing by the television conference apparatus 100 (refer to FIG. 7, Step S18).

If it is determined that that the display data have been received from the television conference apparatus 100 (YES at Step S31), the received display data are displayed on the television conference screen 271 on the monitor 270 (Step S33). The processing then returns to Step S31.

If it is determined that that the display data have not been received from the television conference apparatus 100 (NO at Step S31), a determination is made as to whether one of the edit data request information and the image data request information has been received from the television conference apparatus 100 (Step S32). The edit data request information and the image data request information are transmitted in the main processing by the television conference apparatus 100 (refer to FIG. 7, Steps S20, S21).

If it is determined that one of the edit data request information and the image data request information has been received from the television conference apparatus 100 (YES at Step S32), a transmission information flag is stored in a transmission information storage area (not shown in the drawings) in the RAM 203 (Step S34). If the edit data request information has been received, one is stored as the value of the transmission information flag. If the image data request information has been received, zero is stored as the value of the transmission information flag. The value of the transmission information flag is initialized to zero when the power supply of the terminal device 200 is turned on. Therefore, in the initial state, the image data are displayed in the terminal-specific area 272 that corresponds to each of the terminal devices 200.

Next, the terminal-specific data that will be transmitted to the television conference apparatus 100 are set based on the transmission information flag that is stored in the transmission information storage area (not shown in the drawings) in the RAM 203 (Step S35). In a case where the value of the transmission information flag is zero, the image data that have been captured by the camera 250 that is connected to the terminal device 200 are set as the terminal-specific data. In a case where the value of the transmission information flag is one, the edit data for the terminal device 200 are set as the terminal-specific data that will be transmitted to the television conference apparatus 100. The terminal-specific data are thus set based on the received request information, so it is not necessary for the user to change, on the terminal device 200 side, the terminal-specific data that will be transmitted to the television conference apparatus 100.

Next, the terminal-specific data that have been set at Step S35 are transmitted to the television conference apparatus 100 (Step S36). The transmitted terminal-specific data are received in the main processing by the television conference apparatus 100 (refer to FIG. 7, Step S11).

Next, the position information for the mouse cursor for the terminal device 200 is transmitted to the television conference apparatus 100 (Step S37). The processing then returns to Step S31. The transmitted position information is received in the main processing by the television conference apparatus 100 (refer to FIG. 7, Step S13).

If it is determined that neither of the edit data request information and the image data request information has been received from the television conference apparatus 100 (NO at Step S32), the processing proceeds to Step S35. In other words, the terminal-specific data are set based on the previously set value of the transmission information flag and are transmitted to the television conference apparatus 100. In a case where neither the edit data request information nor the image data request information has been received after the main processing is started, such that the value of the transmission information flag has not been changed even once, the image data that have been captured by the camera 250 are transmitted to the television conference apparatus 100.

As explained previously, the television conference apparatus 100 receives the position information for the mouse cursor from each of the terminal devices 200. Furthermore, for each of the terminal-specific areas 272, the determination is made as to whether at least one cursor that corresponds to one of the terminal devices 200 that can edit the edit data for the terminal device 200 that corresponds to the terminal-specific area 272 is located in the terminal-specific area 272 based on the edit authority table 1100 that is stored in the edit authority table storage area 1101. If it is determined that at least one cursor for one of the terminal devices 200 that can edit the edit data is located in the terminal-specific area 272, the edit data request information is transmitted to the terminal device 200 that corresponds to the terminal-specific area 272. Therefore, in a case where the user wants to edit the edit data for one of the terminal devices 200, the user may simply move the mouse cursor into the terminal-specific area 272 that corresponds to that terminal device 200. This makes it possible for the user to easily switch the terminal-specific data to the edit data for the terminal device 200 for which the terminal device 200 that the user is using has edit authority.

Moreover, in a case where the position of the mouse cursor is within one of the terminal-specific areas 272, the image data for the cursor image 275 of the mouse cursor is integrated into the display data and displayed only if the terminal device 200 that the user is using has the authority to edit the edit data for the terminal device 200 that corresponds to that terminal-specific area 272. Thus the mouse cursor for one of the terminal devices 200 that does not have the edit authority is not displayed within that terminal-specific area 272. This makes it easier to look at the television conference screen 271, because large numbers of the mouse cursors for the terminal devices 200 that do not have the edit authority are not displayed in that terminal-specific area 272.

In the embodiment that is described above, the television conference apparatus 100 receives the terminal-specific data from each of the terminal devices 200 that are connected to the television conference apparatus 100 and creates the display data. The television conference apparatus 100 then transmits the display data to each of the terminal devices 200. However, the display data may not necessarily be created by the television conference apparatus 100. For example, a multi-point control unit may be provided in the network 2, and the multi-point control unit may create the display data.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A television conference apparatus that transmits display data to a plurality of terminals, the display data being data for displaying an image in a display area, the plurality of terminals being configured to be connected to the television conference apparatus, the television conference apparatus comprising:

a first receiving device that receives terminal-specific data that are one of terminal image data and edit data, the terminal image data being image data transmitted from each of the plurality of terminals, and the edit data being editable data transmitted from each of the plurality of terminals;

a first display data creation device that creates first display data that are display data for displaying the terminal-specific data transmitted from each of the plurality of terminals in each of a plurality of terminal-specific areas, the plurality of terminal-specific areas being included in the display area and respectively corresponding to the plurality of terminals;

a second receiving device that receives position information transmitted from each of the plurality of terminals, the position information being information that specifies a position indicated by a pointer in the display area, and the pointer corresponding to each of the plurality of terminals;

a second display data creation device that creates second display data by combining pointer image data with the created first display data, the pointer image data being image data of the pointer that is located at the position specified by the received position information;

a display data transmission device that transmits the second display data created by the second display data creation device to the plurality of terminals;

an edit authority storage device that stores edit authority information in association with identification information, the identification information being information that identifies each of the plurality of terminals, and the edit authority information being information that indicates whether each of the plurality of terminals identified by the identification information has authority to edit edit data displayed in each of the plurality of terminal-specific areas;

a first determination device that determines whether each of the plurality of terminal-specific areas includes the position specified by the position information transmitted from a terminal that has the authority to edit the edit data displayed therein based on the position information received by the second receiving device and on the edit authority information stored in the edit authority storage device; and a command transmission device that transmits a first request information to a terminal corresponding to a first area and that transmits a second request information to a terminal corresponding to a second area, the first request information being information for requesting that the edit data be transmitted as the terminal-specific data, the first area being a terminal-specific area which the first determination device has determined includes the position specified by the position information transmitted from the terminal that has the authority to edit the edit data displayed therein, the second request information being information for requesting that the terminal image data be transmitted as the terminal-specific data, and the second area being a terminal-specific area which the first determination device has determined does not include the position specified by the position information transmitted from the terminal that has the authority to edit the edit data displayed therein.

2. The television conference apparatus according to claim 1, further comprising:

a second determination device that determines whether the position specified by the position information received by the second receiving device is included in one of the plurality of terminal-specific areas; and a third determination device that determines whether a terminal that transmitted the position information that specifies an intra-area position has the authority to edit the edit data displayed in the terminal-specific area including the intra-area position based on the edit authority information stored in the edit authority storage device, the intra-area position being a position which the second determination device has determined is included in one of the plurality of terminal-specific areas, wherein the second display data creation device creates the second display data by combining pointer image data of only a first pointer and a second pointer with the first display data, the first pointer being a pointer that corresponds to the terminal that transmitted the position information that specifies the position which the second determination device has determined is not included in one of the plurality of terminal-specific areas, and the second pointer being a pointer that corresponds to the terminal which the third determination device has determined has the authority to edit the edit data displayed in the terminal-specific area including the intra-area position.

3. A method for controlling a television conference in which display data are transmitted to a plurality of terminals, the display data being data for displaying an image in a display area, the plurality of terminals being configured to be connected to a television conference apparatus, the method comprising the steps of:

receiving terminal-specific data that are one of terminal image data and edit data, the terminal image data being image data transmitted from each of the plurality of terminals, and the edit data being editable data transmitted from each of the plurality of terminals;

creating first display data that are display data for displaying the terminal-specific data transmitted from each of the plurality of terminals in each of a plurality of terminal-specific areas, the plurality of terminal-specific areas being included in the display area and respectively corresponding to the plurality of terminals;

receiving position information transmitted from each of the plurality of terminals, the position information being information that specifies a position indicated by a pointer in the display area, and the pointer corresponding to each of the plurality of terminals;

creating second display data by combining pointer image data with the created first display data, the pointer image data being image data of the pointer that is located at the position specified by the received position information;

transmitting the created second display data to the plurality of terminals;

determining whether each of the plurality of terminal-specific areas includes the position specified by the position information transmitted from a terminal that has authority to edit edit data displayed therein based on the received position information and on edit authority information, the edit authority information being information that indicates whether each of the plurality of terminals identified by an identification information has the authority to edit the edit data displayed in each of the plurality of terminal-specific areas and that is associated with the identification information, and the identification information being information that identifies each of the plurality of terminals;

transmitting a first request information to a terminal corresponding to a first area, the first request information being information for requesting that the edit data be transmitted as the terminal-specific data, and the first area being a terminal-specific area which has been determined to include the position specified by the position information transmitted from the terminal that has the authority to edit the edit data displayed therein; and transmitting a second request information to a terminal corresponding to a second area, the second request information being information for requesting that the terminal image data be transmitted as the terminal-specific data, and the second area being a terminal-specific area which has been determined not to include the position specified by the position information transmitted from the terminal that has the authority to edit the edit data displayed therein.

4. The method according to claim 3, wherein:

the method further comprises the steps of:

determining whether the position specified by the received position information is included in one of the plurality of terminal-specific areas; and determining whether a terminal that transmitted the position information that specifies an intra-area position has the authority to edit the edit data displayed in the terminal-specific area including the intra-area position based on the edit authority information, the intra-area position being a position which has been determined to be included in one of the plurality of terminal-specific areas, and the second display data are created by combining pointer image data of only a first pointer and a second pointer with the first display data, the first pointer being a pointer that corresponds to the terminal that transmitted the position information that specifies the position which has been determined not to be included in one of the plurality of terminal-specific areas, and the second pointer being a pointer that corresponds to the terminal which has been determined to have the authority to edit the edit data displayed in the terminal-specific area including the intra-area position.

5. A computer-readable storage medium storing a control program executable on a television conference apparatus that transmits display data to a plurality of terminals, the display data being data for displaying an image in a display area, the plurality of terminals being configured to be connected to the television conference apparatus, the program comprising instructions that cause a computer to perform the steps of:

receiving terminal-specific data that are one of terminal image data and edit data, the terminal image data being image data transmitted from each of the plurality of terminals, and the edit data being editable data transmitted from each of the plurality of terminals;

creating first display data that are display data for displaying the terminal-specific data transmitted from each of the plurality of terminals in each of a plurality of terminal-specific areas, the plurality of terminal-specific areas being included in the display area and respectively corresponding to the plurality of terminals;

receiving position information transmitted from each of the plurality of terminals, the position information being information that specifies a position indicated by a pointer in the display area, and the pointer corresponding to each of the plurality of terminals;

creating second display data by combining pointer image data with the created first display data, the pointer image data being image data of the pointer that is located at the position specified by the received position information;

transmitting the created second display data to the plurality of terminals;

determining whether each of the plurality of terminal-specific areas includes the position specified by the position information transmitted from a terminal that has authority to edit edit data displayed therein based on the received position information and on edit authority information, the edit authority information being information that indicates whether each of the plurality of terminals identified by an identification information has the authority to edit the edit data displayed in each of the plurality of terminal-specific areas and that is associated with the identification information, and the identification information being information that identifies each of the plurality of terminals;

transmitting a first request information to a terminal corresponding to a first area, the first request information being information for requesting that the edit data be transmitted as the terminal-specific data, and the first area being a terminal-specific area which has been determined to include the position specified by the position information transmitted from the terminal that has the authority to edit the edit data displayed therein; and transmitting a second request information to a terminal corresponding to a second area, the second request information being information for requesting that the terminal image data be transmitted as the terminal-specific data, and the second area being a terminal-specific area which has been determined not to include the position specified by the position information transmitted from the terminal that has the authority to edit the edit data displayed therein.

6. The computer-readable storage medium according to claim 5, wherein:

the program further comprises instructions that cause the computer to perform the steps of:

determining whether the position specified by the received position information is included in one of the plurality of terminal-specific areas; and determining whether a terminal that transmitted the position information that specifies an intra-area position has the authority to edit the edit data displayed in the terminal-specific area including the intra-area position based on the edit authority information, the intra-area position being a position which has been determined to be included in one of the plurality of terminal-specific areas, and the second display data are created by combining pointer image data of only a first pointer and a second pointer with the first display data, the first pointer being a pointer that corresponds to the terminal that transmitted the position information that specifies the position which has been determined not to be included in one of the plurality of terminal-specific areas, and the second pointer being a pointer that corresponds to the terminal which has been determined to have the authority to edit the edit data displayed in the terminal-specific area including the intra-area position.

7. A video conference apparatus configured to transmit display data to a plurality of terminals, the display data being data for displaying an image in a display area, the video conference apparatus being configured to be connected to the plurality of terminals, the video conference apparatus comprising:

a first receiving device configured to receive terminal-specific data that are one of terminal image data and edit data, the terminal image data being image data having been transmitted from each of the plurality of terminals, and the edit data being editable data having been transmitted from each of the plurality of terminals;

a first display data creation device configured to create first display data that are display data for displaying the terminal-specific data having been transmitted from each of the plurality of terminals in each of a plurality of terminal-specific areas, the plurality of terminal-specific areas being included in the display area and respectively corresponding to the plurality of terminals;

a second receiving device configured to receive position information having been transmitted from each of the plurality of terminals, the position information being information that specifies a position indicated by a pointer in the display area, and the pointer corresponding to each of the plurality of terminals;

a second display data creation device configured to create second display data by combining pointer image data with the created first display data, the pointer image data being image data of the pointer that is located at the position specified by the received position information;

a display data transmission device configured to transmit the second display data created by the second display data creation device to the plurality of terminals;

an edit authority storage device configured to store edit authority information in association with identification information, the identification information being information that identifies each of the plurality of terminals, and the edit authority information being information that indicates whether each of the plurality of terminals identified by the identification information has authority to edit edit data displayed in each of the plurality of terminal-specific areas;

a first determination device configured to determine whether each of the plurality of terminal-specific areas includes the position specified by the position information having been transmitted from a terminal that has the authority to edit the edit data displayed therein based on the position information received by the second receiving device and on the edit authority information stored in the edit authority storage device; and a command transmission device configured to transmit a first request information to a terminal corresponding to a first area and to transmit a second request information to a terminal corresponding to a second area, the first request information being information for requesting that the edit data be transmitted as the terminal-specific data, the first area being a terminal-specific area which the first determination device has determined includes the position specified by the position information having been transmitted from the terminal that has the authority to edit the edit data displayed therein, the second request information being information for requesting that the terminal image data be transmitted as the terminal-specific data, and the second area being a terminal-specific area which the first determination device has determined does not include the position specified by the position information having been transmitted from the terminal that has the authority to edit the edit data displayed therein.

8. The video conference apparatus according to claim 7, wherein the video conference apparatus is a personal computer.

* * * * *